UNITED STATES PATENT OFFICE.

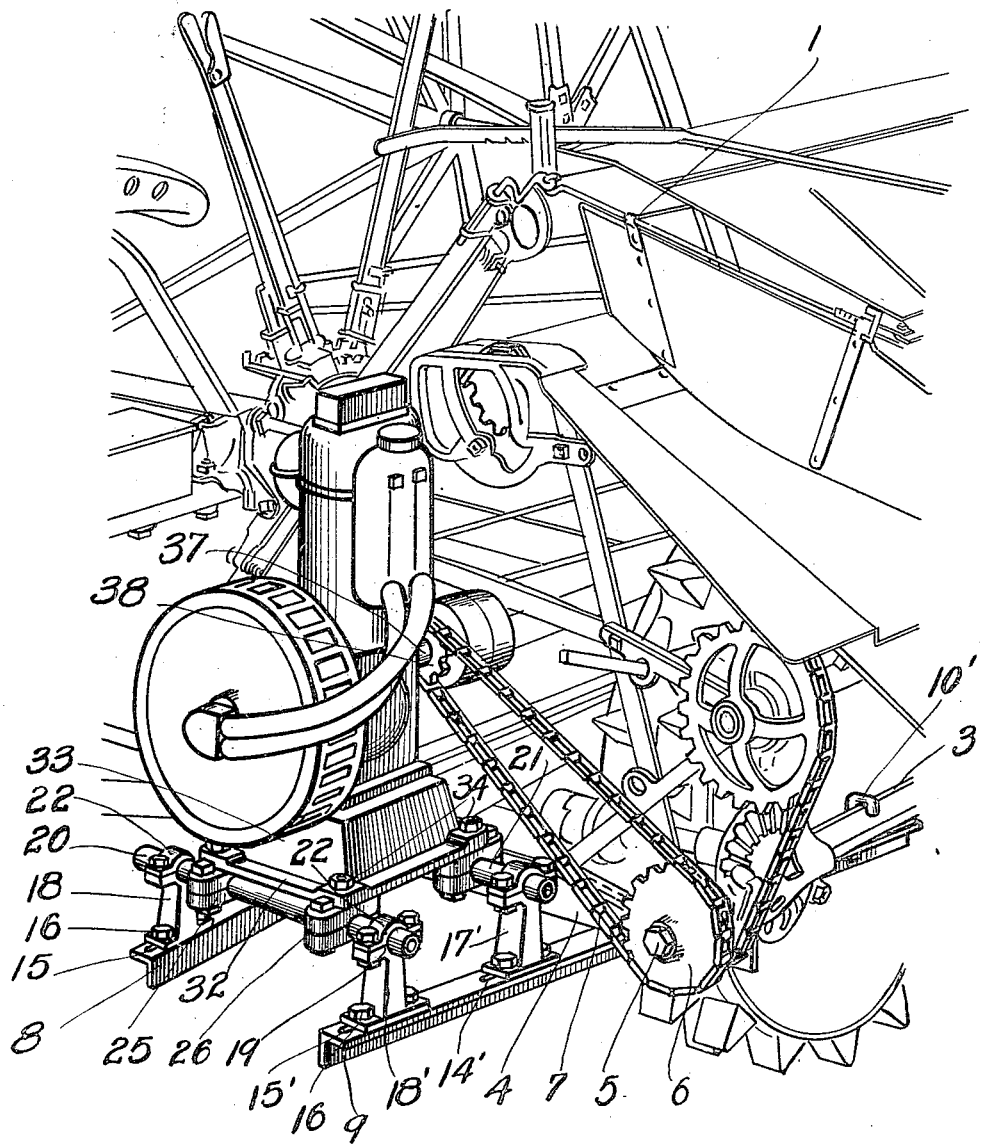

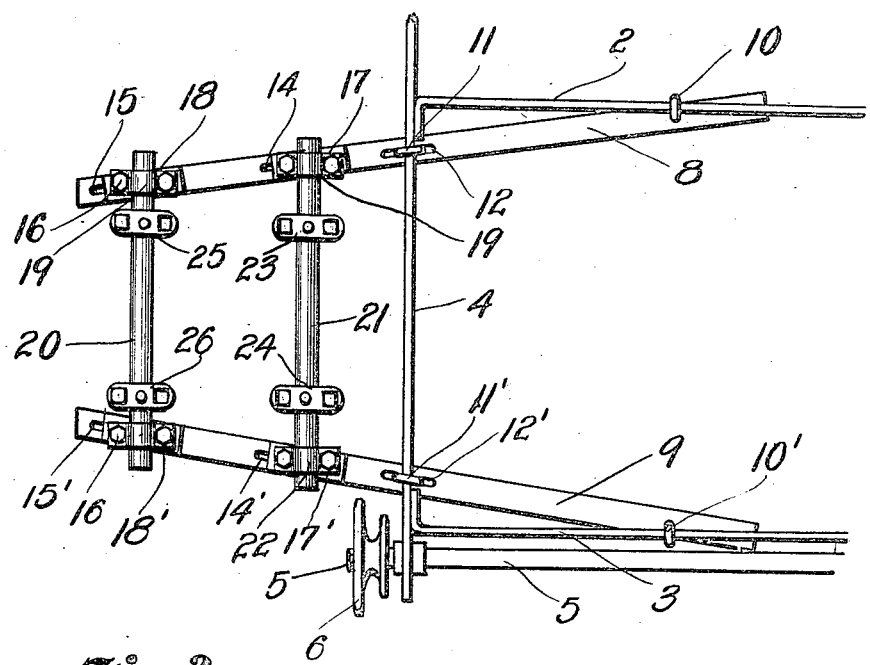

HARRY E. SCHANK, OF TOPEKA, KANSAS, ASSIGNOR TO THE PIERSEN MANUFACTURING COMPANY, OF TOPEKA, KANSAS, A CORPORATION OF KANSAS.

ENGINE MOUNTING.

1,410,725.     Specification of Letters Patent.     Patented Mar. 28, 1922.

Application filed September 20, 1920. Serial No. 411,529.

*To all whom it may concern:*

Be it known that I, HARRY E. SCHANK, a citizen of the United States, residing at Topeka, in the county of Shawnee and State of Kansas, have invented certain new and useful Improvements in Engine Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to engine mountings for agricultural machines and particularly for harvesters and other portable farm machines adapted to be propelled over the ground by power other than that utilized for driving the operating mechanism of the agricultural machine.

The invention particularly contemplates the provision of means for standardizing the engine mounting to adapt it for differently constructed machines as well as to provide means for accurately positioning the engine on machines having the same general characteristics as to type. For convenience, the invention will be described in connection with a harvesting machine.

On account of the fraility of the harvester superstructure, it has been deemed expedient to mount the engine for driving the operating parts of the harvester mechanism upon the rear of the main frame, as this is best adapted to withstand the shocks and stresses due to the vibration of the engine when in operation.

While all harvester or binder manufacturers follow a more or less uniform plan of construction, the constructions of different makes of machines vary sufficiently to present difficulties in applying the same type of engine to all of them unless some provision is made to compensate for the variations found in the frames, and I have, therefore, provided an engine mounting which is adapted to be applied to any type of machine in the most convenient manner without requiring any special tools or any special knowledge of mechanics on the part of the operator installing the same.

While I have shown the invention as applied to a harvester, it is obviously adapted to be applied to other forms of supports. The frame which supports the engine mounting may partake of any preferred form although the engine mounting is particularly applicable for connection to a rectangular frame, to which it may be conveniently attached and I, therefore, do not desire to be limited to any particular means for supporting the mounting except as particularly specified in the appended claims.

In the drawings,

Fig. 1 is a fragmentary, perspective view of a harvester to which my invention is applied.

Fig. 2 is a fragmentary top view of the engine mounting, the engine being removed.

Fig. 3 is a sectional view through a bar on the rear frame of the harvester and through a supporting bar for the engine mounting, the connecting element being shown in elevation.

Fig. 4 is a sectional view through one of the bars of the harvester frame, the engine mounting bar being shown in elevation with a U-bolt for connecting them, and Fig. 5 is a sectional view through a clamp for connecting the engine base to its support.

Referring now to the drawings by numerals of reference:

1 designates a harvester of approved construction provided with a rear end frame, shown as substantially rectangular and provided with side bars 2 and 3 connected by a transverse end bar 4, the frame carrying a shaft 5 provided with a sprocket 6, which may receive motion from a chain or belt 7, driven from the engine, as will be explained hereinafter.

Extending diagonally across the respective corners formed by the bars 2 and 3 and the end bar 4 are supporting beams, illustrated as consisting of angle bars 8 and 9, connected to the bars 2 and 3 by suitable clamping members 10 and 11 for the bar 8 and 10′ and 11′ for the bar 9. The clamping members may consist of either U-bolts or J-bolts, and by reference to Fig. 2 it will be observed that the beams 8 and 9 are longitudinally slotted, as at 12 and 12', to receive the U-bolts 11 and 11', engaging the bar 4 so that by loosening the fastening members on the bolts 10, 10', 11 and 11', the beams 8 and 9 may be adjusted both longitudinally and laterally to provide the proper angle, the beams 8 and 9 being shown as converging rearwardly so that the rear ends are closer together than the forward ends.

The rearwardly extending ends of the bars 8 and 9 which project beyond the frame consisting of the bars 2, 3 and 4 are provided with spaced longitudinal slots 14 and 15 for the bar 8 and 14' and 15' for the bar 9. The slots 14 and 14' in the respective bars 8 and 9 are substantially in transverse alignment, as are also the slots 15 and 15', the slots being adapted to receive bolts 16, projecting through the bases of the standards 17 and 18 on bar 8 and 17' and 18' on bar 9. Therefore, it will be apparent that the sets of standards on the respective bars may be adjusted longitudinally of the bars and that lateral adjustment between the standards may be effected by moving the rear ends of the bars 8 and 9 toward and away one from the other.

The upper ends of the standards are provided with seats 19 to receive transverse trusses or supports, shown as pipes 20 and 21, the pipes being clamped to their seats by straps 22, which secure them rigidly to the standards 17, 18, 17' and 18'. The trusses serve as tie rods for the rear ends of the bars 8 and 9 and also as truss supports for the base of the engine to be supported by the engine mounting.

In Fig. 5 I have shown a sectional view through one of the mounting blocks for securing the engine base to the truss. There are four blocks shown and these are designated 23, 24, 25 and 26 respectively. For the purpose of illustration, it will be assumed that the section is taken through the block or clamp 23. The securing blocks or clamps are shown as consisting of an upper member 27 and a lower member 28. The upper member is provided with a concave truss rod-engaging seat 29, which is recessed at 30 to receive the head of a bolt 31, the bolt being adapted to pass through the flange 32 of the engine base 33 and be secured thereto by a nut 34 so that the upper member is rigidly fixed with respect to the engine base. The upper member is secured to the truss rod 20 or 21, as the case may be by bolts 35 and 36, which pass through it and through the lower member 28, the heads of the bolts 36 in each instance being counter-sunk to allow the engine base flange to rest flat upon the upper member 27, the bolt 35 passing through the members 27 and 28 beyond the perimeter of the engine base.

The engine may be of appropriate construction and provided with a drive shaft 37, provided with a sprocket 38 from which the chain 7 on the sprocket 6 is driven, the chain being adapted to be tightened by moving the blocks or clamps 23, 24, 25 and 26 transversely on the truss rod and the sprockets 6 and 38 may be aligned by shifting the standards 17, 17', 18 and 18' longitudinally of the bars 8 and 9. Therefore, any desired adjustment may be made by loosening the necessary bolts, shifting the parts until the proper alignment is effected, and then tightening them.

It will be apparent that the engine mounting may be easily applied to a frame to efficiently support the engine. A rectangular frame, however, particularly lends itself to the type of device illustrated since the arrangement of the converging bars across the angles formed by the side bars and end bars of the frame render the mounting stable and permits it to be readily attached to the frame by a minimum number of fastening devices, in the present instance, four. These fastening devices may be so constructed that lateral and longitudinal adjustments may be effected without the aid of special tools and without special knowledge of mechanics on the part of the operator installing the same. This is of prime importance since in many types of machines the exact location of certain of the parts to be driven cannot at first be determined, so it becomes necessary to adjust the engine in order to effect the desired alignment of the driving and driven members. The construction illustrated is such, however, that proper alignment adjustments may be readily made by a single operator in a minimum amount of time and without the necessity of special tools.

What I claim and desire to secure by Letters-Patent is:

1. In an engine mounting, a substantially rectangular frame, converging beams adjustably clamped to the side bars of said frame and to one end bar thereof, and an engine base support longitudinally adjustable on said beams.

2. In an engine mounting, a substantially rectangular frame, converging beams adjustably clamped to the side bars of said frame and to one end bar thereof, and an engine base support longitudinally and laterally adjustable on said beams.

3. In an engine mounting, a substantially rectangular frame, converging beams adjustably clamped to the side bars of said frame and to one end bar thereof, and an engine base laterally adjustable on said beams.

4. In an engine mounting, a frame, supporting beams clamped to the frame, pairs of standards longitudinally adjustable on the beams, transverse bars connecting opposite standards of the respective pairs, and engine base-engaging means on the bars.

5. In an engine mounting, a frame, supporting beams on the frame, pairs of standards longitudinally adjustable on the beams, transverse bars connecting opposite standards of the respective pairs, and laterally adjustable engine base-engaging means on the bars.

In testimony whereof I affix my signature.

HARRY E. SCHANK.